US010421528B2

(12) United States Patent
Kismarton et al.

(10) Patent No.: US 10,421,528 B2
(45) Date of Patent: Sep. 24, 2019

(54) PLANKED STRINGERS THAT PROVIDE STRUCTURAL SUPPORT FOR AN AIRCRAFT WING

(71) Applicant: The Boeing Company, Chicago, IL (US)

(72) Inventors: Max U. Kismarton, Renton, WA (US); Clayton L. Munk, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 390 days.

(21) Appl. No.: 15/238,223

(22) Filed: Aug. 16, 2016

(65) Prior Publication Data

US 2018/0050788 A1 Feb. 22, 2018

(51) Int. Cl.
| | | |
|---|---|---|
| *B64C 3/20* | (2006.01) | |
| *B29C 70/30* | (2006.01) | |
| *B64C 3/18* | (2006.01) | |
| *B64C 3/26* | (2006.01) | |
| *B29L 31/30* | (2006.01) | |

(52) U.S. Cl.
CPC ............. *B64C 3/20* (2013.01); *B29C 70/30* (2013.01); *B64C 3/182* (2013.01); *B64C 3/185* (2013.01); *B64C 3/26* (2013.01); *B29L 2031/3076* (2013.01)

(58) Field of Classification Search
CPC .......... B64C 3/18; B64C 3/182; B64C 3/185; B64C 3/20
See application file for complete search history.

(56) References Cited

U.S. PATENT DOCUMENTS

| | | | | |
|---|---|---|---|---|
| 2,961,053 A | | 11/1960 | Prewitt et al. | |
| 3,002,717 A | * | 10/1961 | Pavlecka ............ | B64C 3/26 244/124 |
| 3,078,911 A | * | 2/1963 | Prewitt ............... | B64C 3/00 156/581 |
| 4,395,450 A | * | 7/1983 | Whitener ............ | B29C 70/24 428/116 |

(Continued)

FOREIGN PATENT DOCUMENTS

EP    2759470 A2    7/2014

OTHER PUBLICATIONS

European Search Report; EP17185985; dated Jan. 26, 2018.

*Primary Examiner* — Brian M O'Hara
*Assistant Examiner* — Christopher D Hutchens
(74) *Attorney, Agent, or Firm* — Duft & Bornsen, PC (57) ABSTRACT

Systems and methods are provided for structurally supporting an aircraft wing. The system comprises a section of aircraft wing that includes skin. The skin surrounds an internal volume of the wing and comprises layers of Carbon Fiber Reinforced Polymer (CFRP) having fiber orientations aligned to bear shear stresses applied to the wing. The section of aircraft wing also includes planked stringers that are laterally oriented within the wing, contact the skin within the internal volume, are attached to the skin, and comprise layers of CFRP having fiber orientations that are aligned to bear bending at the wing. Furthermore, the section includes spars that are positioned between planked stringers on an upper portion of the wing and planked stringers on a lower portion of the wing, wherein the spars are aligned with the planked stringers.

20 Claims, 9 Drawing Sheets

(56) References Cited

U.S. PATENT DOCUMENTS

| | | | |
|---|---|---|---|
| 4,606,961 A | 8/1986 | Munsen et al. | |
| 4,662,587 A * | 5/1987 | Whitener | B29C 70/24 244/117 R |
| 4,749,155 A | 6/1988 | Hammer et al. | |
| 6,237,873 B1 | 5/2001 | Amaoka et al. | |
| 7,806,367 B2 | 10/2010 | Lopez et al. | |
| 7,837,148 B2 | 11/2010 | Kismarton et al. | |
| 7,851,040 B2 | 12/2010 | Victorazzo | |
| 7,922,454 B1 * | 4/2011 | Riddell | F03D 1/0675 416/224 |
| 8,157,213 B2 | 4/2012 | Escobar et al. | |
| 8,215,584 B2 | 7/2012 | Cazeneuve et al. | |
| 8,257,048 B2 * | 9/2012 | Yarbrough | F03D 1/065 244/123.8 |
| 8,684,311 B2 | 4/2014 | Nordman et al. | |
| 8,915,471 B2 | 12/2014 | Nordman et al. | |
| 9,463,866 B2 | 10/2016 | Dominguez et al. | |
| 2005/0247818 A1 * | 11/2005 | Prichard | B64C 1/12 244/1 R |
| 2009/0294591 A1 * | 12/2009 | Ramirez Blanco | B64C 1/1446 244/129.4 |
| 2010/0170985 A1 | 7/2010 | Flood | |
| 2010/0178453 A1 | 7/2010 | Wood | |
| 2010/0230541 A1 | 9/2010 | Benavides et al. | |
| 2011/0293432 A1 * | 12/2011 | Hibbard | F03D 1/0675 416/223 R |
| 2012/0104170 A1 | 5/2012 | Gallant et al. | |
| 2013/0233973 A1 | 9/2013 | Nordman et al. | |
| 2014/0145032 A1 | 5/2014 | Moselage | |
| 2014/0161512 A1 | 6/2014 | Nordman et al. | |
| 2015/0246718 A1 * | 9/2015 | Aitken | B64C 1/26 29/897.2 |
| 2015/0353181 A1 | 12/2015 | Domínguez et al. | |
| 2015/0360764 A1 | 12/2015 | Eales | |
| 2016/0176500 A1 * | 6/2016 | Ross | B29D 99/0014 428/157 |
| 2016/0207607 A1 * | 7/2016 | Charles | B64C 1/064 |
| 2017/0008611 A1 * | 1/2017 | Murta | B64C 3/185 |
| 2017/0029137 A1 * | 2/2017 | Aitken | B64C 1/26 |

\* cited by examiner

PLANKED STRINGERS THAT PROVIDE STRUCTURAL SUPPORT FOR AN AIRCRAFT WING

FIELD

The disclosure relates to the field of aircraft, and in particular, to structural components of an aircraft wing.

BACKGROUND

The structural components of an aircraft wing withstand a variety of forces during flight, takeoff, and landing. These structural components are also designed to meet a large number of requirements (e.g., bird strike, lightning strike, air loads, ground loads, fuel pressure, etc.), and meeting these requirements while conforming with cost and manufacturing constraints remains a complicated process.

There are a wide variety of techniques and designs for building aircraft wings. In particular, designs for wings that utilize composite parts have become popular because these designs reduce weight and increase strength. However, composite aircraft wings remain complex to model and expensive to test. To meet all the aforementioned requirements, engineers prefer to design composite parts that substantially adhere to existing designs for metallic wing parts. However, doing so does not take full advantage of the composite materials. For example, metal designs utilize a large number of fastened components. In composite designs, the components could be integrated into a single, cheaper lighter design, such as a unitized/monolithic design.

SUMMARY

Examples described herein provide for designs where laterally extending composite planked stringers are laid flat against the skin of an aircraft wing. The planked stringers and the skin therefore may share (e.g., in a complementary fashion) loads applied to the wing during flight (e.g., shear stresses, bending stresses, etc.). Furthermore, spars may run beneath the planked stringers, connecting planked stringers on an upper portion of the wing to a lower portion of the wing in order to bear forces that would otherwise cause buckling of the planked stringers.

One embodiment comprises a section of aircraft wing that includes skin. The skin surrounds an internal volume of the wing and comprises layers of Carbon Fiber Reinforced Polymer (CFRP) having fiber orientations aligned to bear shear stresses applied to the wing. The section of aircraft wing also includes planked stringers that are laterally oriented within the wing, contact the skin within the internal volume, are attached to the skin, and comprise layers of CFRP having fiber orientations that are aligned to bear bending at the wing. Furthermore, the section includes spars that are positioned between planked stringers on an upper portion of the wing and planked stringers on a lower portion of the wing, wherein the spars are aligned with the planked stringers.

A further embodiment is a system. The system includes a composite skin defining a surface of a section of an aircraft wing. The system also includes an upper composite planked stringer that contacts the skin, is integral with the skin, and is laterally oriented within the wing. Furthermore, the system includes a spar that is fixedly attached to the upper composite planked stringer, extends vertically beneath a portion of the upper composite planked stringer, and is fixedly attached to a lower composite planked stringer located beneath the spar.

A further embodiment is a method. The method includes laying up a composite skin defining a portion of an aircraft wing, laying up a composite planked stringer that is laterally oriented within the wing, and contacts against the skin. The method also includes attaching the planked stringer to a spar that extends vertically beneath the planked stringer.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

FIGS. 1-6 illustrate the structure of an exemplary aircraft which may utilize enhanced composite planked stringers that bear bending loads at wings of the aircraft. As used herein, a planked stringer comprises a "flat" component of support structure underneath a skin of an aircraft, which extends towards a wing tip of the aircraft along the wing axis. The planked stringers discussed herein lie substantially flat against the skin of the aircraft, and may be co-cured with the skin.

Figure 1:
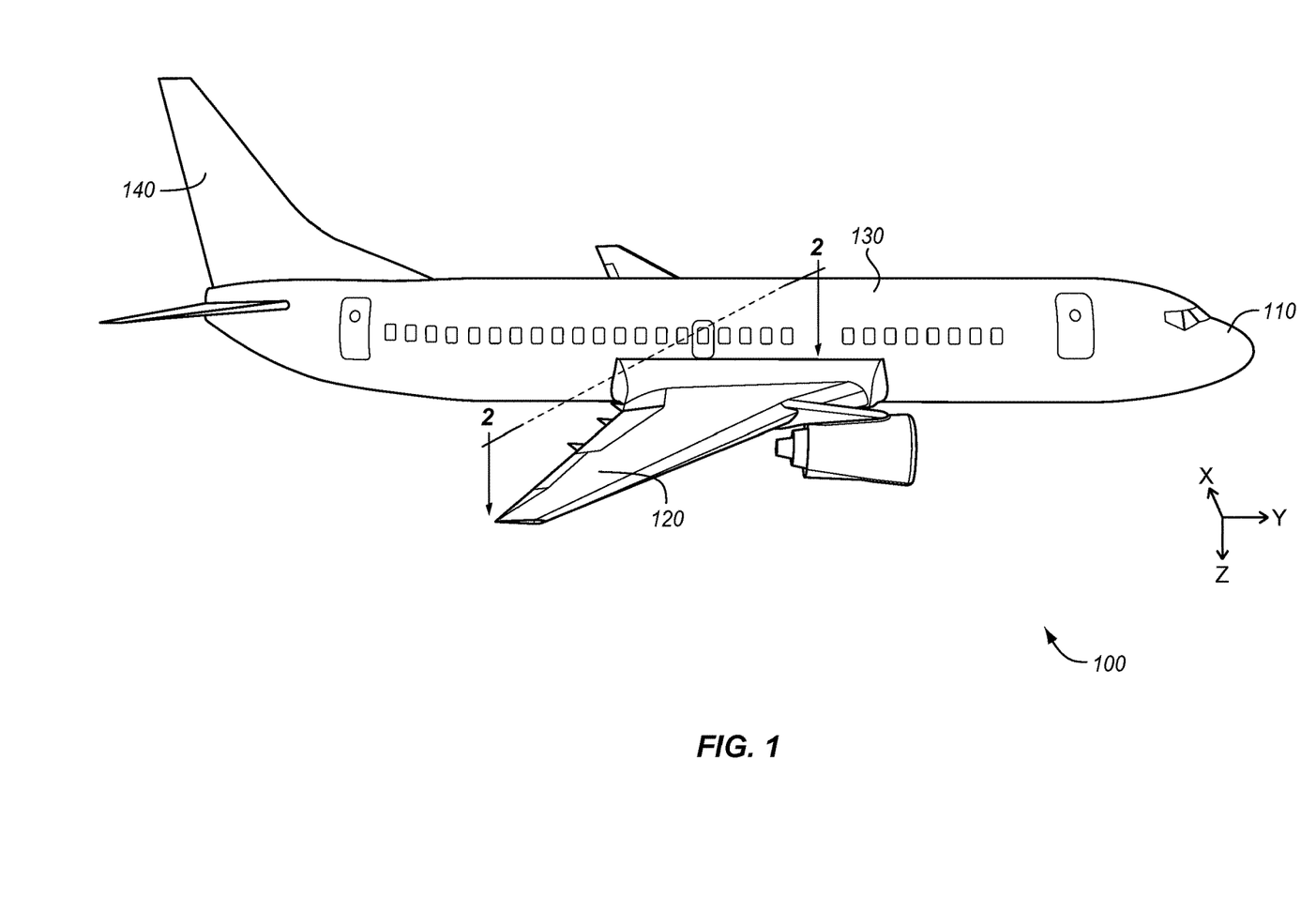
FIG. 1 is a diagram of an aircraft in an exemplary embodiment.
Figure 2:
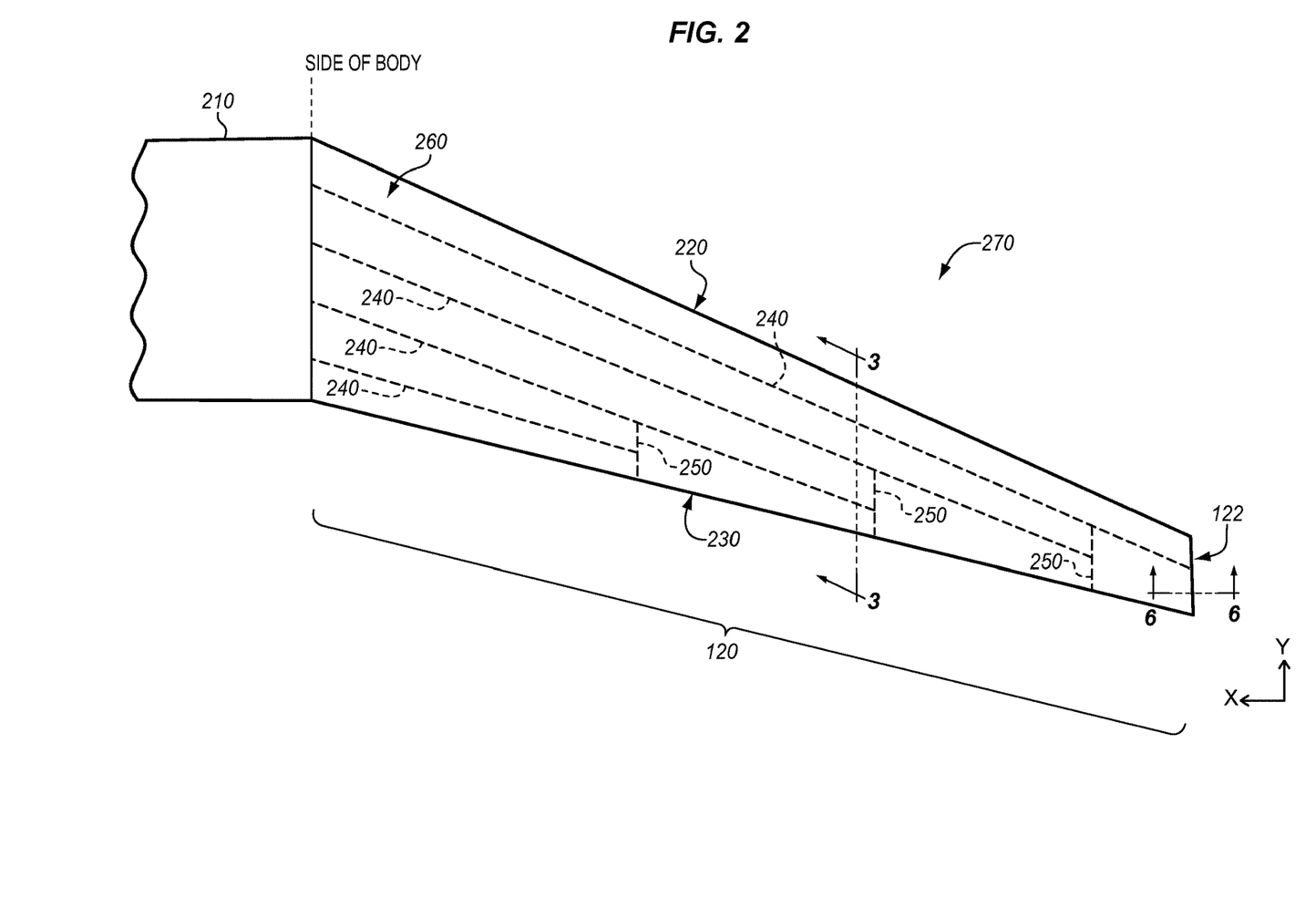
FIG. 2 is a diagram of a portion of a wing box of an aircraft in an exemplary embodiment.

FIG. 1 is a diagram of an aircraft 100 in an exemplary embodiment. Aircraft 100 includes nose 110, outboard sections 120 of a wing box, fuselage 130, and tail 140. FIG. 1 also illustrates a downward direction (Z) for aircraft 100. FIG. 2 is a diagram of a portion of wing box 270 in an exemplary embodiment. Wing box 270 comprises the structural portion of the wings, located between leading edges and trailing edges of the wings. Wing box 270 serves to carry bending moments, provide torsional rigidity, and/or carry fuel for aircraft 100. Specifically, FIG. 2 is a top view indicated by view arrows 2 of FIG. 1. According to FIG. 2, outboard section 120 is physically attached to center section 210, which couples outboard section 120 to another outboard section 120 (not shown) of wing box 270.

In this embodiment, outboard section 120 includes skin 260. Skin 260 may comprise a multi-layer cured composite material such as Carbon Fiber Reinforced Polymer (CFRP), having a total thickness for example between about 0.15 and 0.6 inches (e.g., between about 30-100 layers). In one embodiment, a majority of the layers of skin 260 have fiber orientations that bear bending loads along outboard section 120 while also providing torsional rigidity to wing box 270 (e.g., fiber orientations of +/−45°). Skin 260 surrounds outboard section 120, and defines an internal volume in which planked stringers 240 are disposed.

Planked stringers 240 are laterally oriented within outboard section 120 (that is, planked stringers 240 run laterally/continue along outboard section 120 towards wing tip 122). As outboard section 120 extends outward towards wing tip 122, the number of planked stringers 240 disposed from fore to aft along outboard section 120 may reduce in number. Planked stringers 240 may, for example, terminate at supports 250. Planked stringers 240 may comprise multi-layer composite parts similar to those described above for skin 260. However, planked stringers 240 are thicker than skin 260 (e.g., an inch of thickness owing to a greater number of layers in each planked stringer 240), and a majority of the layers of each planked stringer 240 may have fiber orientations that bear bending along outboard section 120 and help to stiffen skin 260 to prevent buckling (e.g., fiber orientations of 0°). FIG. 2 further illustrates front spar 220 (e.g., for a leading edge of outboard section 120) and rear spar 230 (e.g., for a trailing edge of outboard section 120).

Figure 3:
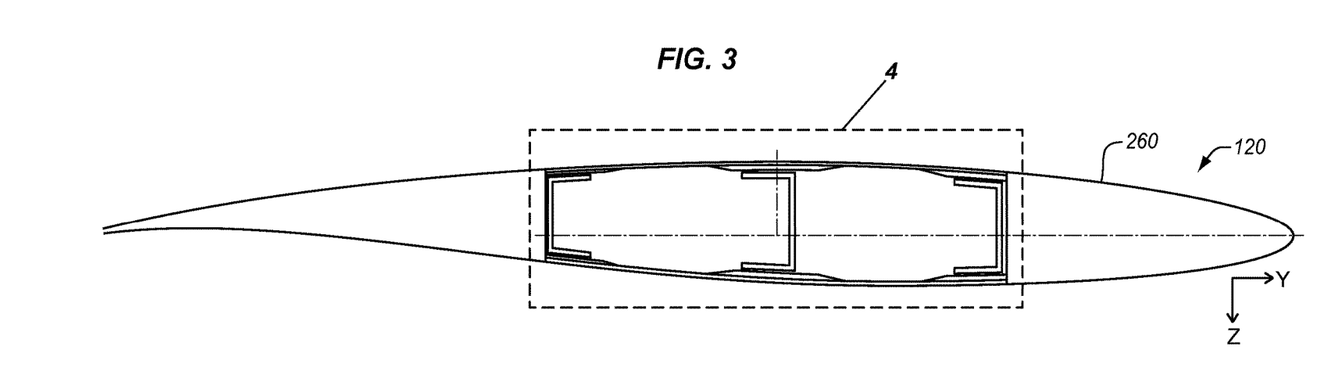
FIG. 3 is a cut-through view of a section of a wing box in an exemplary embodiment.
Figure 4:
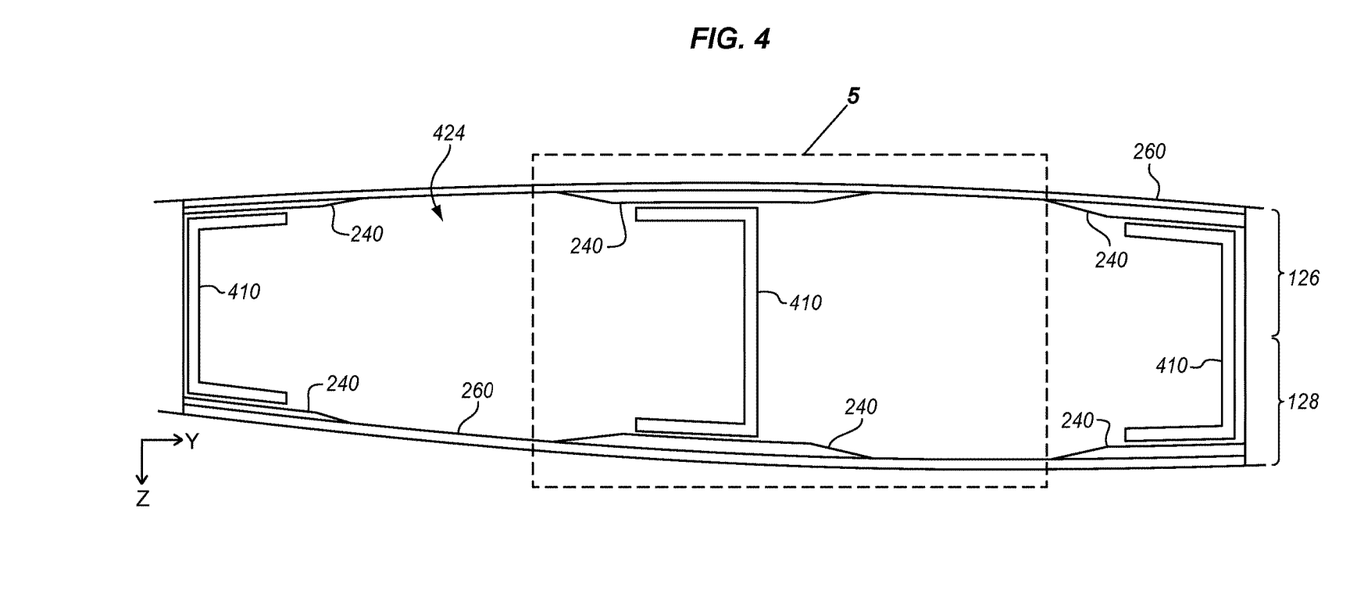
FIGS. 4-5 are zoomed in views illustrating a spar attached to two planked stringers of a wing in an exemplary embodiment.

FIG. 3 is a cut-through view of outboard section 120 in an exemplary embodiment that further illustrates planked stringers 240. FIG. 3 is indicated by view arrows 3 of FIG. 2. In this embodiment, the cut-through view illustrates region 4 located within outboard section 120. FIG. 4 is a zoomed in view of region 4 of FIG. 3, where skin 260 surrounds an internal volume 424 of outboard section 120. FIG. 4 illustrates spars 410, which are each vertically aligned with, and disposed between, a pair of planked stringers 240. Spars 410 run along the length of planked stringers 240 (i.e., substantially in the x direction), and are fixedly attached to planked stringers 240 to ensure that planked stringers 240 do not experience buckling when bearing bending loads. Spars 410 are illustrated in FIG. 4 as "C-spars" that unite planked stringers 240 on upper portion 126 of outboard section 120, and planked stringers 240 on lower portion 128 of outboard section 120. However, in further embodiments spars 410 may have any desired cross sectional shape (e.g., an "I" shape, an "L" shape, a "Z" shape, etc.).

FIG. 4 further illustrates that planked stringers 240 lie substantially flat against skin 260, and are attached to skin 260. Thus, regardless of any differences between skin thickness and planked stringer thickness, a thickness of a planked stringer 240 is less than a width of that planked stringer. As used herein, planked stringers 240 are "attached" to skin 260 in that planked stringers 240 are physically mated with skin 260, and thus in some embodiments planked stringers 240 are attached to skin 260 in a manner that makes planked stringers 240 integral with skin 260, such as via co-curing with skin 260. Thus, skin 260 and planked stringer 240 may be co-cured to create one integral part, may be laid-up and cured separately onto each other, or may otherwise be united into an integral part by curing and/or bonding these components together.

Figure 5:
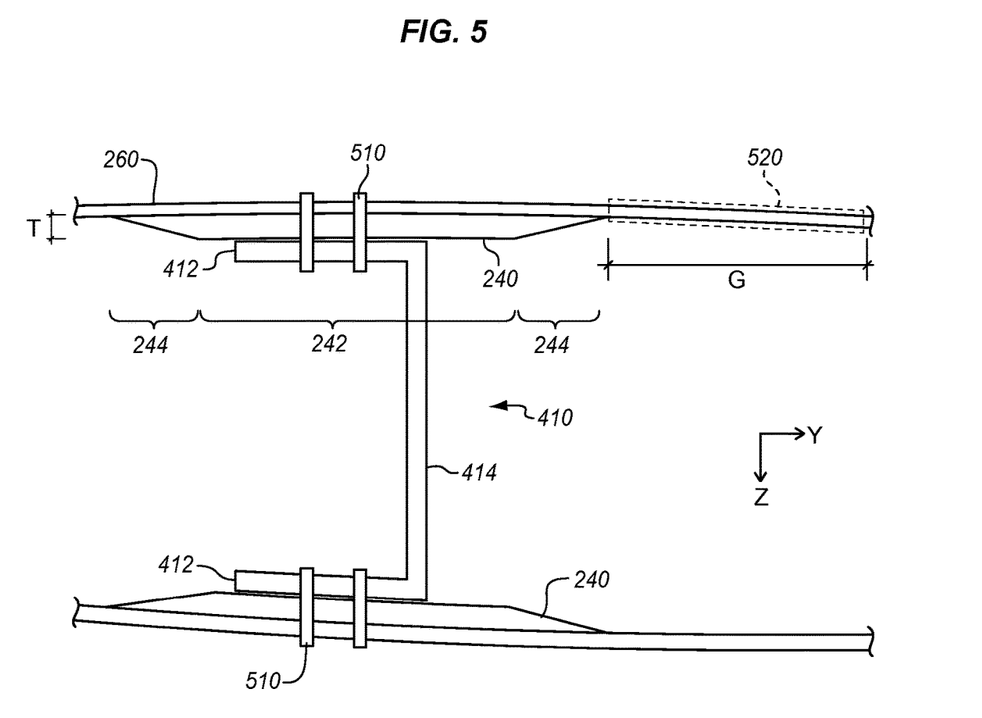

FIG. 5 is a zoomed in view of region 5 of FIG. 4. As shown in FIG. 5, each planked stringer 240 includes a central region 242 having a thickness T (e.g., one inch), and outer regions 244 that taper off from thickness T to meet with skin 260. In short, a thickness of each planked stringer 240 tapers off from aft to fore at a ratio of at least two parts of fore extension to one part reduction in thickness. In this embodiment, each planked stringer 240 exhibits three parts extension to one part reduction in thickness. Each of planked stringers 240 covers a portion of skin 260 extending from fore to aft (e.g., a ten inch wide portion). However, planked stringers 240 are separated from fore to aft by gaps (G). In one embodiment, each gap is fourteen inches across. This means that an access point 520 (e.g., an access panel) to internal features of outboard section 120 may penetrate through skin 260 at a gap G, without penetrating through a planked stringer 240 or otherwise compromising the integrity of a planked stringer 240.

FIG. 5 further illustrates spars 410, which each include flanges 412 and body 414. In this embodiment, each spar 410 is fixedly attached/fastened to planked stringers 240 via fixation elements 510 (e.g., bolts, pins, rivets, etc.), while in further embodiments (e.g., where spar 410 is a composite part) each spar 410 may be bonded (e.g., glued), co-cured, or otherwise affixed to planked stringers 240. In one embodiment, spars 410 are spaced twenty four inches apart from each other, and this distance between spars 410 reduces as spars 410 extend towards wing tip 122.

Figure 6:
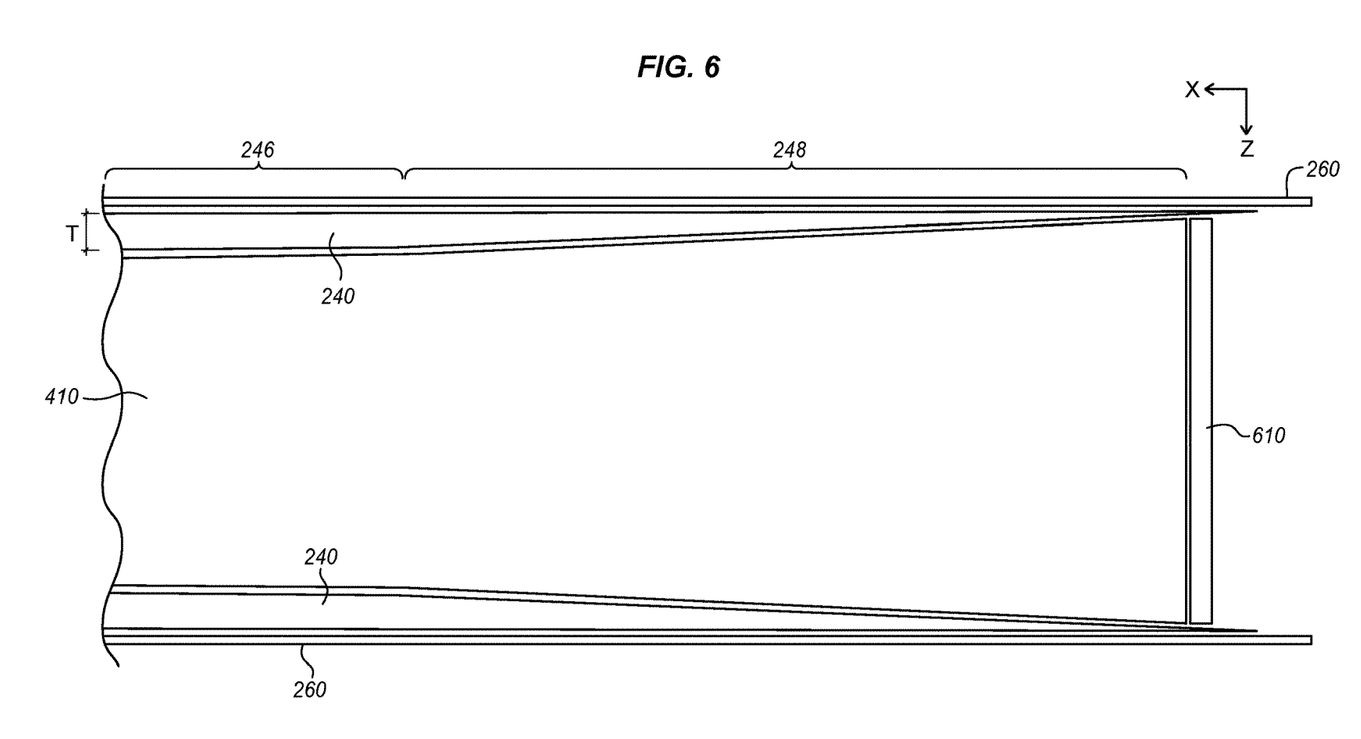
FIG. 6 is a further cut-through view of a section of a wing box proximate to a wing tip in an exemplary embodiment.

FIG. 6 is a further cut-through view of outboard section 120 proximate to wing tip 122 in an exemplary embodiment. Specifically, FIG. 6 is a view indicated by view arrows 6 of FIG. 2. As shown in FIG. 6, planked stringers 240 may taper off laterally (i.e., in the X direction) as they extend from center section 210 of FIG. 2 towards wing tip 122 of FIG. 2. For example, a planked stringer 240 may maintain thickness T in region 246, and then taper off in thickness as planked stringer 240 extends towards wing tip 122 at a ratio of at least ten parts of lateral extension to one part reduction in thickness (e.g., at a ramp ratio between two thousand to one and ten to one, such as a ramp ratio of one hundred parts of lateral extension to one part reduction in thickness). In such an embodiment, spar 410 increases in size/thickness as spar 410 extends towards wing tip 122. That is, each spar 410 increases in thickness as its corresponding planked stringer(s) proceed to decrease in thickness moving towards wing tip 122. The increase in thickness corresponds to an amount of tapering of planked stringer 240. FIG. 6 further illustrates a support member 610 proximate to wing tip 122, to which spar 410 and/or planked stringer 240 may be bonded or otherwise fixedly attached.

While FIGS. 2-6 have focused upon planked stringers 240 which reside within outboard section 120, similar techniques and designs may be utilized to reinforce center section 210 with planked stringers as desired. Thus, the embodiments described herein are not limited to planked stringers that are used in outboard sections 120.

Figure 7:
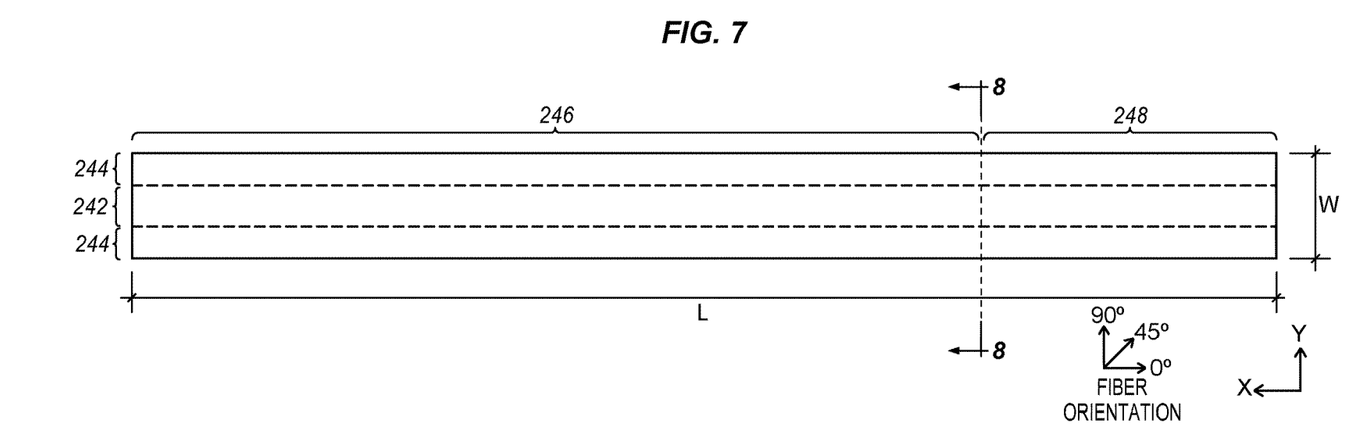
FIGS. 7-8 are diagrams illustrating geometry of a planked stringer in an exemplary embodiment.
Figure 8:
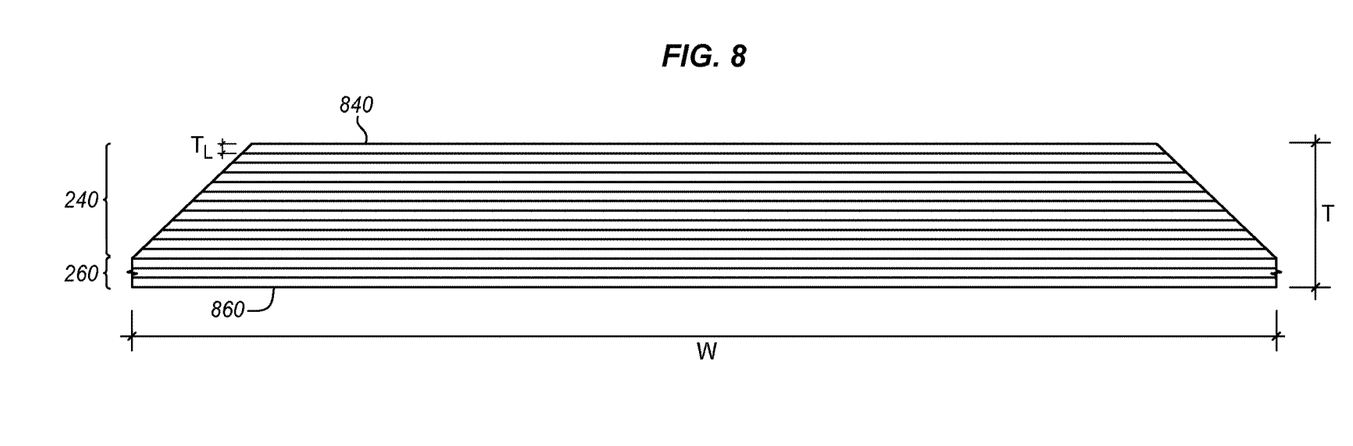

With the placement of planked stringers 240 within outboard section 120 illustrated in the prior figures, FIGS. 7-8 are next provided to illustrate an exemplary planked stringer isolated from other elements of aircraft 100. Specifically, FIGS. 7-8 are diagrams illustrating geometry of a planked stringer 240 in an exemplary embodiment. As shown in FIG. 7, planked stringer 240 has a length L extending in the X direction laterally across outboard section 120, and planked stringer 240 further has a width W extending in the Y direction from fore to aft. Each layer of planked stringer 240 has a fiber orientation varying from 0° to 90°. In this embodiment, a majority of layers of planked stringer 240 have a fiber orientation of 0°. This fiber orientation increases the ability of planked stringer 240 to bear bending loads (e.g., tension and compression) at outboard section 120 as wing tip 122 deflects during flight.

FIG. 8 illustrates a cut-through view of planked stringer 240, corresponding to a slice of planked stringer 240 in a vertical plane extending from fore to aft (i.e., a YZ plane). That is, FIG. 8 illustrates a view corresponding to view arrows 8 of FIG. 7. As shown in FIG. 8, cross sections of planked stringer 240 are quadrilateral. Furthermore, cross sections of planked stringer 240 do not include slopes from fore to aft that are greater in magnitude than forty five degrees, and the cross sections do not include overhangs. Thus, planked stringer 240 lays flat against skin 260 without any vertical projections. FIG. 8 further illustrates that planked stringer 240 has a thickness T, and a thickness of an individual layer $T_L$. The width of planked stringer 240 decreases from a bottom layer 860 in contact with skin 260, to a top layer 840. As shown in FIG. 8, in this embodiment a ratio of width to thickness at planked stringer 240 (e.g., as measured at a cross section in a YZ plane where planked stringer 240 exhibits maximum width and thickness) does not exceed ten. In this embodiment, each layer of planked stringer 240 is planar (e.g., having a substantially planar shape), and each layer of planked stringer 240 is parallel with skin 260 (e.g., a planar layer of skin 260).

Illustrative details of the fabrication of an outboard section 120 utilizing the enhanced planked stringers 240 described above will be discussed with regard to FIG. 9. Assume, for this embodiment, that the structural components of outboard section 120 have not yet been fabricated.

Figure 9:
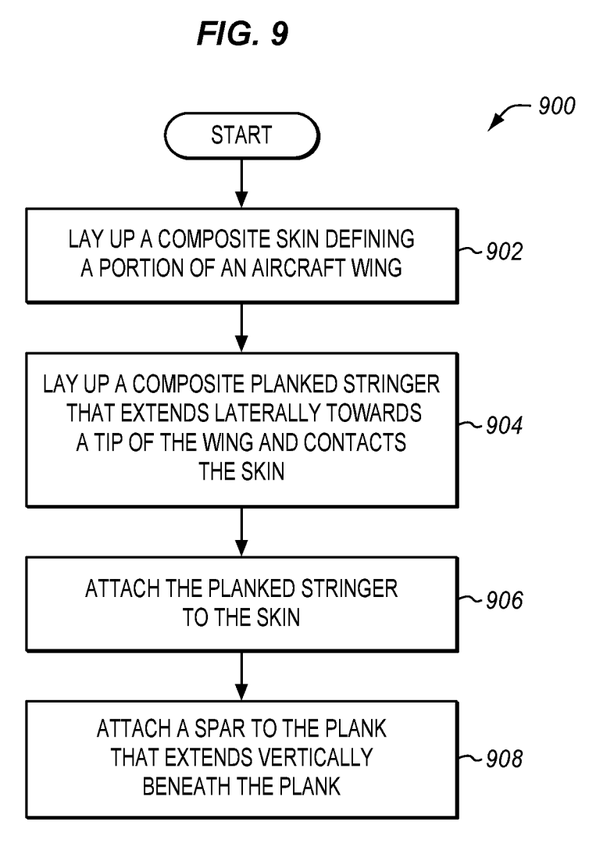
FIG. 9 is a flowchart illustrating a method for fabricating structural components of a wing in an exemplary embodiment.

FIG. 9 is a flowchart illustrating a method 900 for fabricating structural components of a wing in an exemplary embodiment. The steps of method 900 are described with reference to aircraft 100 of FIG. 1, but those skilled in the art will appreciate that method 900 may be performed for other aircraft as desired. The steps of the flowcharts described herein are not all inclusive and may include other steps not shown. The steps described herein may also be performed in an alternative order.

An Automated Fiber Placement (AFP) machine may start the process by laying skin 260 that defines a portion of outboard section 120 (step 902). Skin 260 may be supported by a forming tool if skin 260 remains in an uncured laminate form. Alternatively, if skin 260 is cured, then skin 260 may be rigid and self-supporting. The AFP machine may further lay up a composite planked stringer 240 (e.g., an upper planked stringer with respect to the Y direction) that is laterally oriented within outboard section 120 and lies flat against skin 260 (step 904). That is, the composite planked stringer 240 may extend laterally towards wing tip 122 and contacts skin 210 along the length of planked stringer 240. Planked stringer 240 is then attached to skin 260 e.g., via bonding, co-curing, or the use of fixation elements) (step 906). Spar 410 is attached to planked stringer 240 (again, for example via bonding, co-curing, or the use of fixation elements) such that spar 410 extends vertically (i.e., in the Y direction) beneath planked stringer 240 for attachment to a lower planked stringer 240 (step 908). Utilizing method 900 enables for aircraft wings to be assembled using substantially flat planked stringers 240. Since planked stringers 240 are flat, they are easier to lay up than stringers or other complex parts. This in turn reduces the cost of fabricating the structure of outboard section 120, without compromising the strength or weight of outboard section 120.

EXAMPLES

In the following examples, additional processes, systems, and methods are described in the context of an aircraft wing utilizing an enhanced structure comprising planked stringers and spars.

Figure 10:
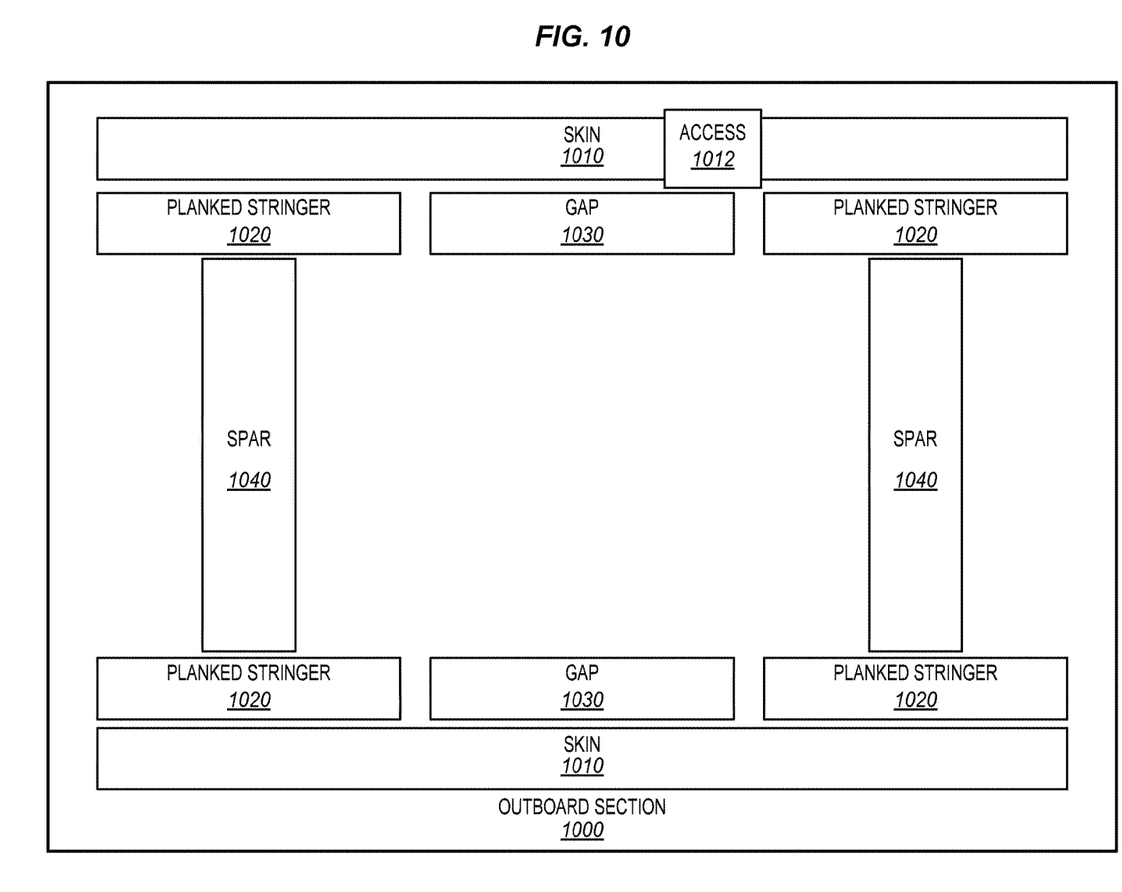
FIG. 10 is a block diagram of an outboard section of a wing box of an aircraft in an exemplary embodiment.

FIG. 10 is a block diagram of an outboard section 1000 of a wing box in an exemplary embodiment. As shown in FIG. 10, outboard section 1000 includes skin 1010, which bounds/surrounds planked stringers 1020. Planked stringers 1020 are co-cured to skin 1010, and between planked stringers 1020 are gaps 1030. Access point 1012 penetrates through skin 1010 at a gap 1030, to ensure that there is no loss of structural integrity at planked stringer 1020. Spars 1040 are fixedly attached to corresponding planked stringers 1020, ensuring that planked stringers 1020 do not buckle.

Figure 11:
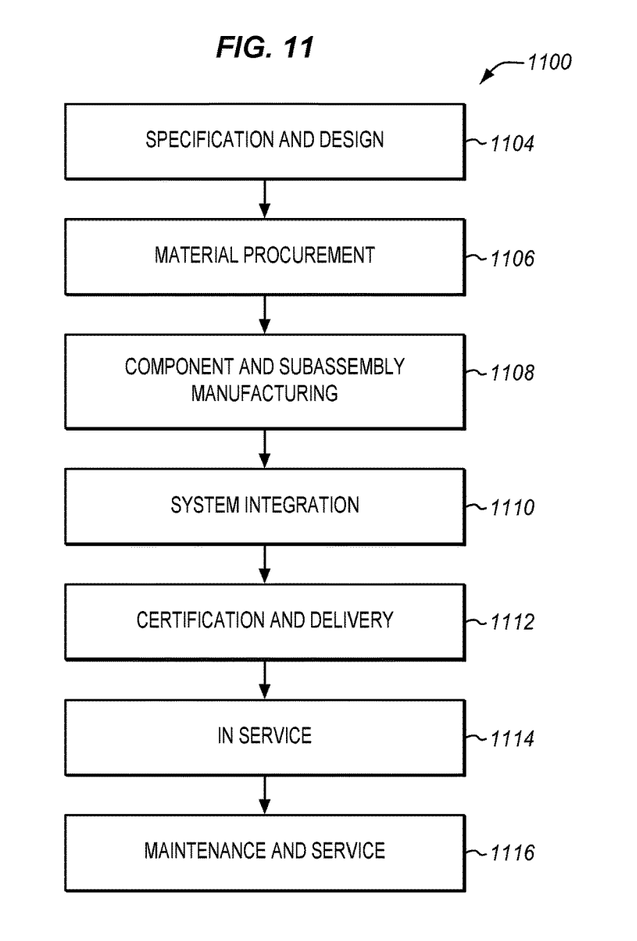
FIG. 11 is a flow diagram of aircraft production and service methodology in an exemplary embodiment.
Figure 12:
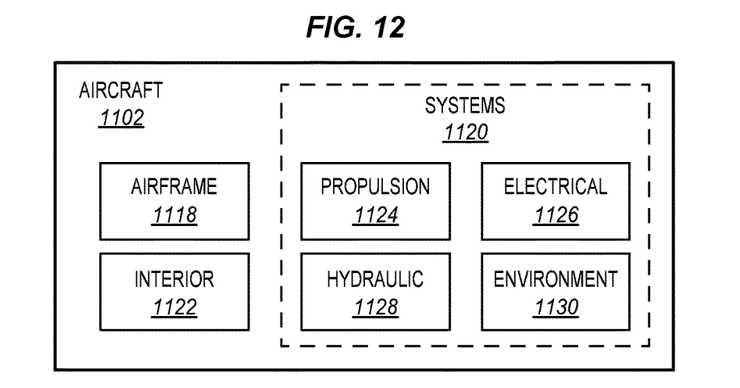
FIG. 12 is a block diagram of an aircraft in an exemplary embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, planked stringer 240 comprises a portion of airframe 118, and is manufactured during component and subassembly manufacturing 1108. Planked stringer 240 may then be assembled into an aircraft in system integration 1110, and then be utilized in service 1114 until wear renders a portion of airframe 1118 unusable. Then, in maintenance and service 1116, a newly fabricated portion of airframe 1118 (e.g., including a new planked stringer) may be installed to replace the unusable portion of airframe 1118.

Any of the various control elements (e.g., electrical or electronic components directing an AFP machine) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
   a section of an aircraft wing comprising:
      skin that surrounds an internal volume of the wing and comprises layers of Carbon Fiber Reinforced Polymer (CFRP) having fiber orientations aligned to bear shear stresses applied to the wing;
      planked stringers that are laterally oriented within the wing, contact the skin within the internal volume, are attached to the skin, and comprise layers of CFRP having fiber orientations that are aligned to bear bending at the wing; and
      spars that are positioned between planked stringers on an upper portion of the wing and planked stringers on a lower portion of the wing, wherein the spars are aligned with the planked stringers, wherein
   each spar increases in thickness as the spar extends towards a tip of the wing corresponding to an amount of tapering by the planked stringers.

2. The system of claim 1 wherein:
   each layer of the planked stringers is planar, and
   each layer of the planked stringers is parallel with a layer of the skin.

3. The system of claim 1 wherein:
   a cross section of each of the planked stringers, corresponding to a vertical plane extending from fore to aft, is quadrilateral.

4. The system of claim 1 wherein:
   a cross section of each of the planked stringers, corresponding to a vertical plane extending from fore to aft, has slopes from fore to aft of a maximum magnitude not exceeding forty five degrees.

5. The system of claim 1 wherein:
   a cross section of each of the planked stringers, corresponding to a vertical plane extending from fore to aft, is trapezoidal.

6. The system of claim 1 wherein:
   a thickness of each planked stringer tapers from aft to fore and fore to aft at a ratio of at least two parts of fore extension to one part reduction in thickness.

7. The system of claim 1 wherein:
   a thickness of each planked stringer tapers off as the planked stringer extends towards a tip of the wing at a ratio of at least ten parts of lateral extension to one part reduction in thickness.

8. The system of claim 1 wherein:
   the spars comprise composite parts.

9. The system of claim 1 wherein:
   each of the planked stringers is co-cured to the skin.

10. The system of claim 1 wherein:
    each of the spars is fixedly attached to the planked stringers via a fixation element.

11. The system of claim 1 wherein:
    each of the spars is bonded to the planked stringers.

12. The system of claim 1 wherein:
    each of the planked stringers is positioned within the internal volume and covers a portion of the skin extending from fore to aft,
    gaps separate the planked stringers from fore to aft, and
    access points to internal features of the wing penetrate through the skin at the gaps, without penetrating through a planked stringer.

13. The system of claim 1 wherein:
the skin and the planked stringers comprise layers of Carbon Fiber Reinforced Polymer (CFRP).

14. The system of claim 1 wherein:
a ratio of planked stringer width to planked stringer thickness does not exceed ten.

15. A system comprising:
a composite skin defining a surface of a section of an aircraft wing;
an upper composite planked stringer that contacts the composite skin, is integral with the composite skin, and is laterally oriented within the aircraft wing; and
a spar that is fixedly attached to the upper composite planked stringer, extends vertically beneath a portion of the upper composite planked stringer, and is fixedly attached to a lower composite planked stringer located beneath the spar, wherein the spar increases in thickness as the spar extends towards the tip of the wing corresponding to an amount of tapering by the upper composite planked stringer and the lower composite planked stringer.

16. The system of claim 15 wherein:
a ratio of width to thickness for the upper composite planked stringer does not exceed ten.

17. A method comprising:
laying up a composite skin defining a portion of an aircraft wing;
laying up a composite planked stringer that is laterally oriented within the aircraft wing and contacts the composite skin;
attaching the composite planked stringer to the skin; and
attaching the composite planked stringer to a spar that extends vertically beneath the composite planked stringer, wherein the spar increases in thickness as the spar extends towards a tip of the wing corresponding to an amount of tapering by the composite planked stringer.

18. The method of claim 17 further comprising:
cutting through the composite skin at a gap between the composite planked stringer and another composite planked stringer, thereby creating an access panel for accessing an internal volume of the aircraft wing.

19. The method of claim 17 wherein:
attaching the composite planked stringer to the spar comprises fastening the spar to the planked stringer.

20. The method of claim 17 further comprising:
laying up the composite planked stringer comprises tapering off a thickness of the composite planked stringer from aft to fore at a ratio of at least two parts of fore extension to one part reduction in thickness.

\* \* \* \* \*